(12) United States Patent
Lin

(10) Patent No.: US 7,374,125 B2
(45) Date of Patent: May 20, 2008

(54) TAPE MEASURE

(75) Inventor: Ping-Lin Lin, Sanchung (TW)

(73) Assignee: Top-Long Industrial Co., Ltd. (TW)

( * ) Notice: Subject to any disclaimer, the term of this patent is extended or adjusted under 35 U.S.C. 154(b) by 324 days.

(21) Appl. No.: 11/198,234

(22) Filed: Aug. 8, 2005

(65) Prior Publication Data

US 2007/0029432 A1    Feb. 8, 2007

(51) Int. Cl.
*B65H 75/30* (2006.01)
(52) U.S. Cl. ............... 242/395; 242/395.1; 242/284
(58) Field of Classification Search ............. 242/395, 242/395.1, 284
See application file for complete search history.

(56) References Cited

U.S. PATENT DOCUMENTS 3,673,823 A * 7/1972 Gakhar ................. 68/12.19

5,462,371 A * 10/1995 Beretta et al. ............. 400/569
5,718,056 A * 2/1998 Miyasaka et al. ............. 33/761
6,357,133 B1 * 3/2002 Hsu ............................. 33/755
6,464,160 B2 * 10/2002 Hsu ............................ 242/395

* cited by examiner

*Primary Examiner*—Peter M. Cuomo
*Assistant Examiner*—Sang Kim
(74) *Attorney, Agent, or Firm*—Troxell Law Office, PLLC

(57) ABSTRACT

A tape measure of the present invention includes a mounted wheel, a pivot portion, rotation members, transmission wheel and a blade container wherein the rotation members include a first gear and a second gear. The mounted wheel has a serrated portion being arranged around inner sides thereof. The pivot portion being fitted into the opening has an axis and a plurality of posts on a side thereof and a driving bar on another side thereof. The transmission wheel has an operation gear. By the first gear and the second gear respectively and cooperatively operate with the mounted wheel and the transmission wheel, the transmission wheel is therefore rotated four circles as the pivot portion is rotated one circle, so duration of reeling the measuring blade becomes less.

4 Claims, 5 Drawing Sheets

TAPE MEASURE

BACKGROUND OF THE INVENTION (a) Field of the Invention

The present invention relates to a tape measure being adapted to enclose a spooled measuring blade and more particularly, to a tape measure having structure for quickly reeling the blade.

(b) Description of the Prior Art

Referring to FIG. 5, a conventional tape measure includes a casing 6 with a toothed part 61, a pivot part 7 having a plurality of sleeves 71 on a side thereon, a plurality of wheels 8 being fitted on the sleeves 71 and being engagable with the toothed part 61, and a driving part 9 having a driving wheel 91 being engagable with wheels 8; by rotating the pivot part 7 to enable the wheels 8 rotating, thereby the driving part 9 being accordingly for reeling blades.

The conventional tape measure, however, can reel blades; duration of reeling blade is too long which is that the wheels 8 forms only single layer; thereby, when the wheels 8 rotate cooperatively with the toothed part 61 and the driving wheel 91, the driving part 9 is rotated only three circles as the pivot part 7 is rotated one circle. Thus, the conventional tape measure is inefficiency in use.

SUMMARY OF THE INVENTION

Accordingly, an object of the present invention is to provide a tape measure which is adapted to enclose a spooled measuring blade and has structure for shortening duration of reeling the measuring blade.

To achieve the above object, a tape measure of the present invention includes a mounted wheel, a pivot portion, rotation members, transmission wheel and a blade container wherein the rotation members includes a first gear and a second gear. By the first gear and the second gear respectively and cooperatively operate with the mounted wheel and the transmission wheel, the transmission wheel is therefore rotated four circles as the pivot portion is rotated one circle, so duration of reeling the measuring blade becomes less.

Other objects, advantages and novel features of the present invention will be drawn from the following detailed embodiment of the present invention with attached drawings.

DESCRIPTION OF THE PREFERRED EMBODIMENT

Figure 1:
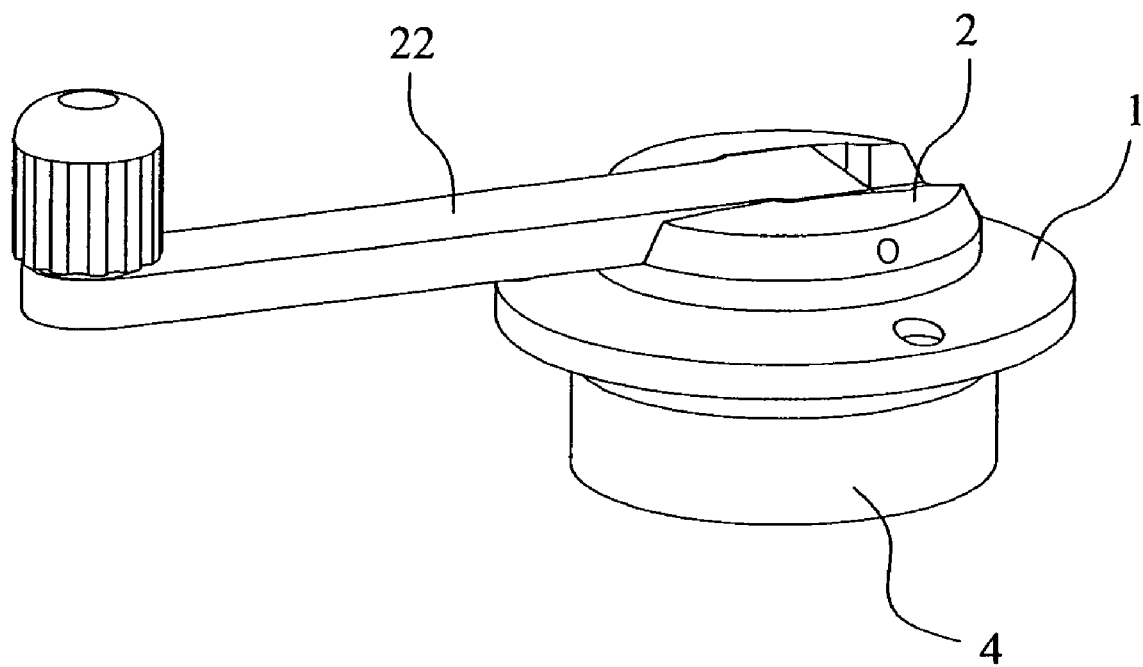
FIG. 1 is an assembly view of a tape measure of the present invention.
Figure 2:
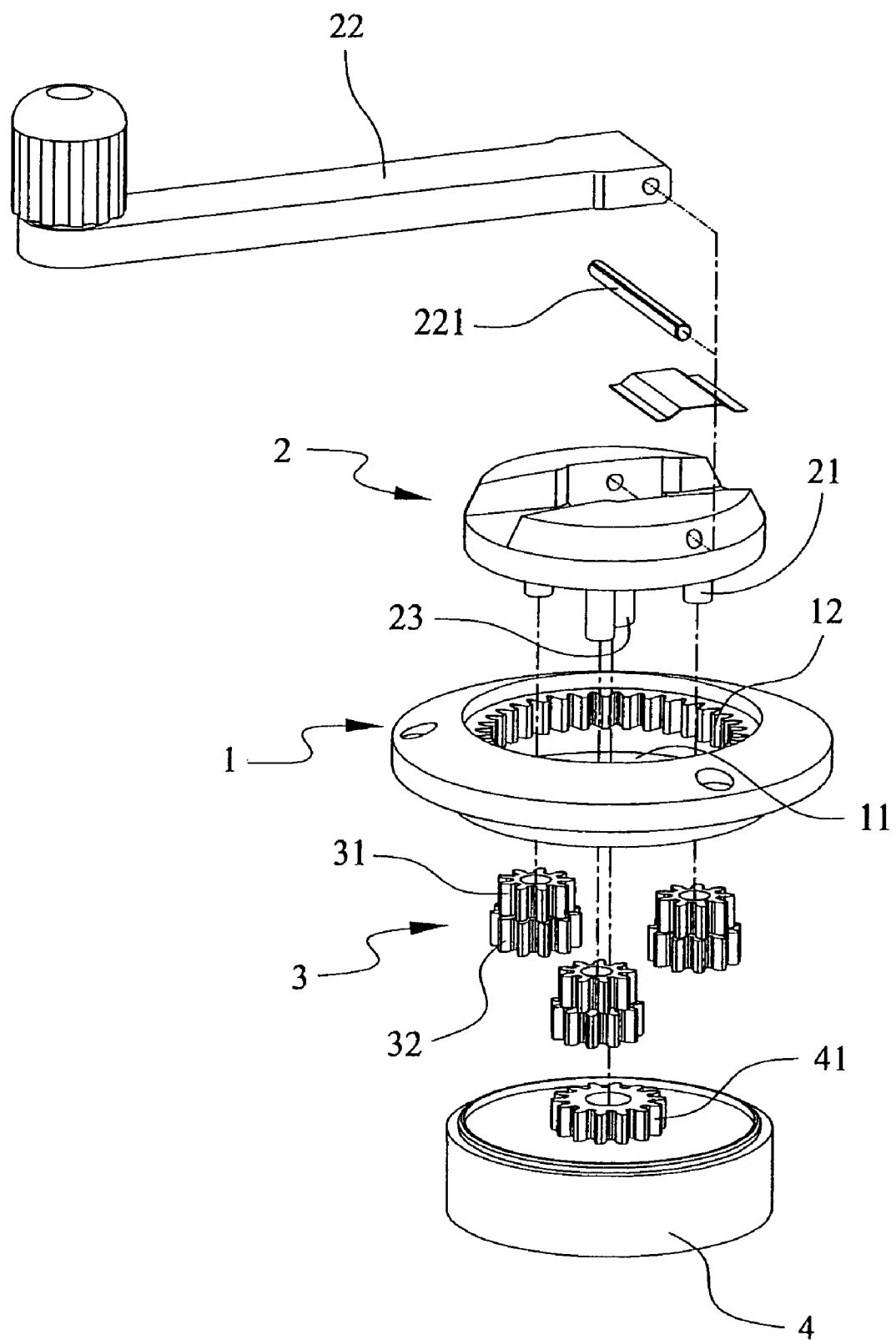
FIG. 2 is an exploded view of FIG. 1.

Referring to FIGS. 1-2, a tape measure of the present invention includes a mounted wheel 1, a pivot portion 2, rotation members 3, transmission wheel 4 and a blade container 5 (not shown).

The mounted wheel 1 has an opening 11 thereon wherein a serrated portion 12 being arranged around inner sides thereof. The pivot portion 2 being fitted into the opening 11 has an axis 23 and a plurality of posts 21 on a side thereof and a driving bar 22 on another side thereof wherein the driving bar 22 is connected with a rod 221 located thereon.

The rotation members 3 being rotatably mounted on the posts 21 includes a first gear 31 and a second gear 32 in which the first and the second gear 31, 32 are stacked with each other, wherein the first gear 31 is engagable with the serrated portion 12 and coaxially shrinks from outer flanges of the second gear 32.

The transmission wheel 4 has an operation gear 41 which operates cooperatively with the axis 23 and which is engagable with the second gear 32.

Figure 3:
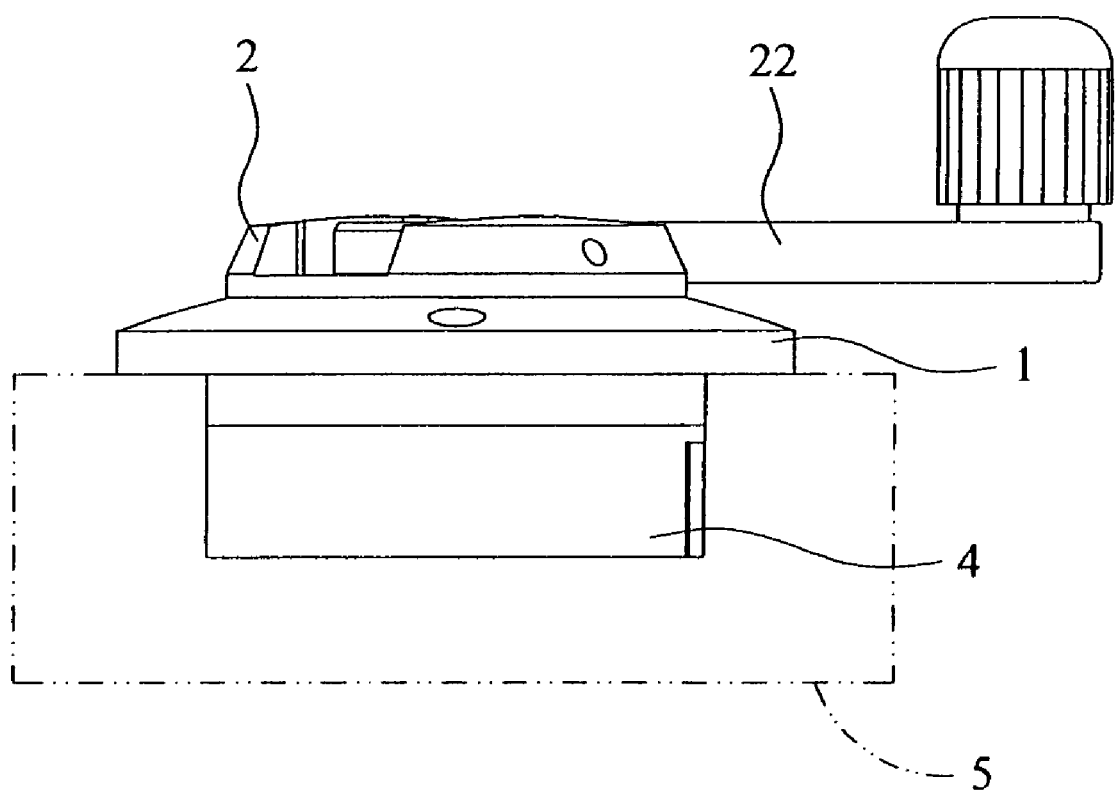
FIG. 3 is a schematic view of the tape measure of the present invention in use.
Figure 4:
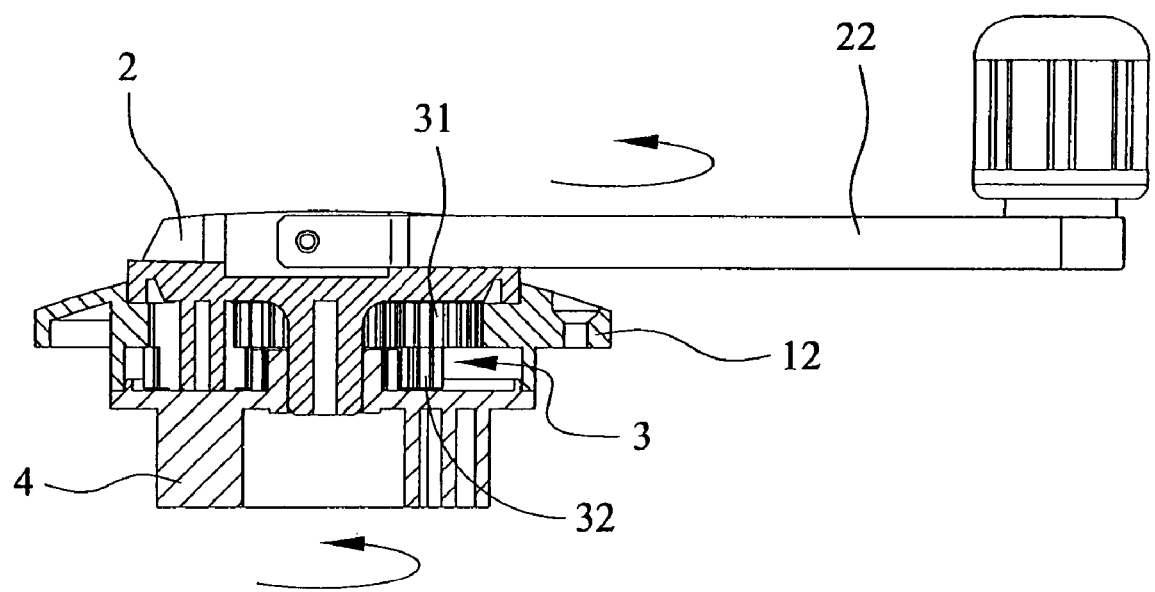
FIG. 4 is a cross-sectional schematic view of FIG. 3.
Figure 5:
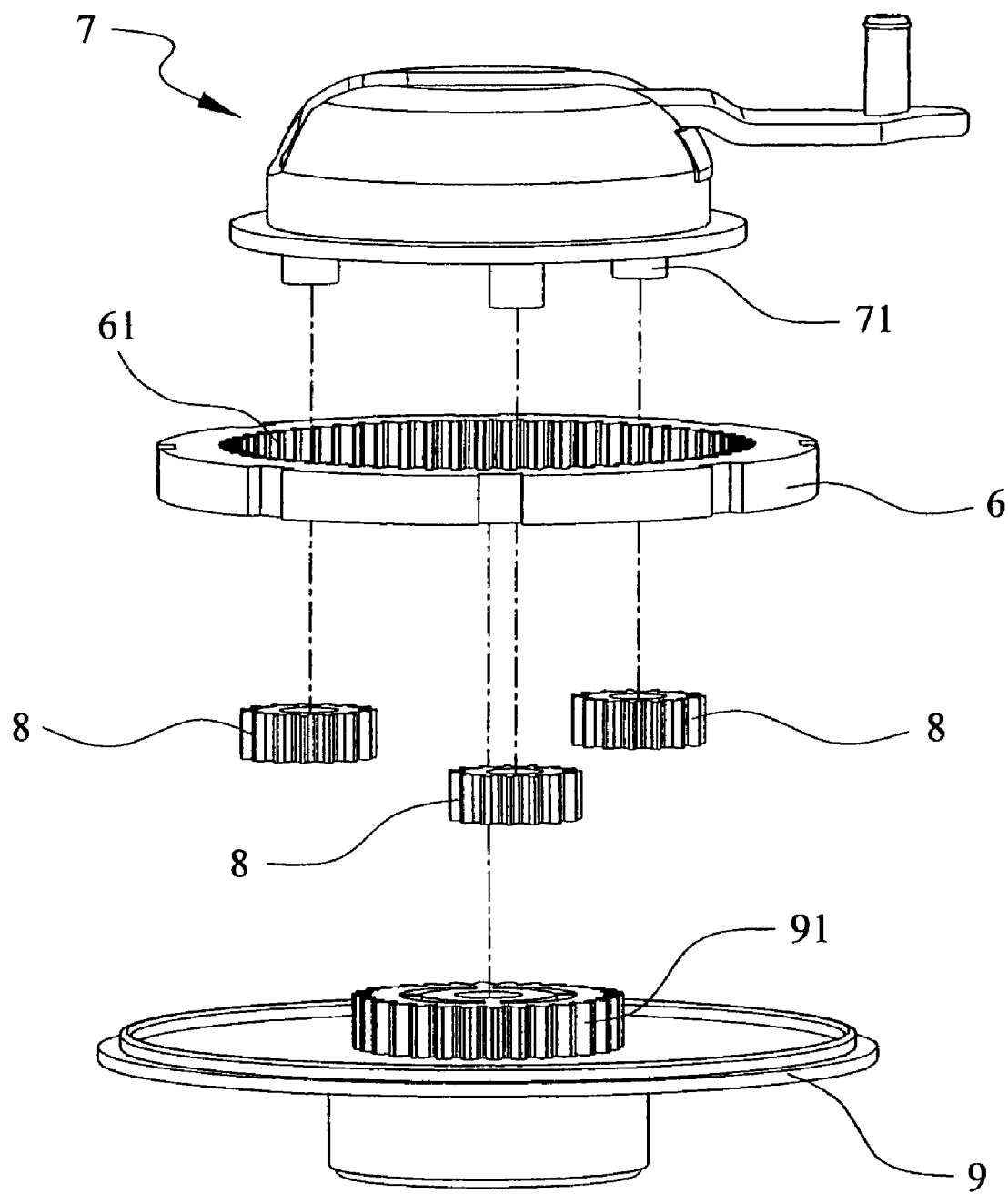
FIG. 5 is an exploded view of a conventional tape measure.

Referring to FIGS. 3 and 4, in use, assemble a side of the transmission wheel 4 to the blade container 5 which encloses a spooled measuring blade (not shown); when a user want to retract the measuring blade, drive the driving bar 22 and, then the rotation members 3 being operated wherein the first gear 31 rotates around the serrated portion 12 of the mounted wheel 1 whereas the second gear 32 rotates accordingly and therefore enables the operation gear 41 operating. Through chain operation the transmission wheel 4 is rotated four circles as the pivot portion 2 is rotated one circle, so duration of reeling the measuring blade becomes less.

Moreover, to decrease density of the first gear 31 and to increase density of the second gear 32 can add rotation circles of the tape measure further to shorten duration of reeling the measuring blade. While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A tape measure comprising:
   a) a mounted wheel having an opening with a serrated portion located on an interior of the opening;
   b) a pivot portion having:
      i) a driving bar located on a top thereof;
      ii) a plurality of posts located on a bottom thereof; and
      iii) an axis located on the bottom thereof;
   c) a plurality of rotation members, one of the plurality of rotation members is rotatably mounted on each of the plurality of posts; each of the plurality of rotation members has a first gear and a second gear located on a bottom of the first gear; and
   d) a transmission wheel having an operation gear rotatably mounted on the axis of the pivot portion,
   wherein the serrated portion located in the opening of the mounted wheel engaging the first gear of each of the plurality of rotation members, and the second gear of each of the plurality of rotation members engaging the operation gear of the transmission wheel.

2. The tape measure according to claim 1, wherein the second gear has an outer diameter larger than an outer diameter of the first gear.

3. The tape measure according to claim 1, wherein the transmission wheel rotating four rotations each time the pivot portion is rotated one rotation.

4. The tape measure according to claim 1, wherein the driving bar is connected to the pivot portion by a rod.

* * * * *